(12) United States Patent
Wienhold

(10) Patent No.: US 6,588,994 B2
(45) Date of Patent: Jul. 8, 2003

(54) DRILL BIT TAIL

(76) Inventor: James L. Wienhold, 3336 Idaho Ave. South, Minneapolis, MN (US) 55426

( * ) Notice: Subject to any disclaimer, the term of this patent is extended or adjusted under 35 U.S.C. 154(b) by 29 days.

(21) Appl. No.: 09/858,254

(22) Filed: May 15, 2001

(65) Prior Publication Data

US 2001/0043840 A1 Nov. 22, 2001

Related U.S. Application Data

(60) Provisional application No. 60/204,973, filed on May 17, 2000.

(51) Int. Cl.⁷ .............................................. B23B 51/02
(52) U.S. Cl. ..................... 408/226; 81/177.1; 76/108.6; 408/239 A
(58) Field of Search .................... 408/226, 227, 408/238, 239 A; 76/108.1, 108.6, 115; 81/177.1

(56) References Cited

U.S. PATENT DOCUMENTS

| | | | |
|---|---|---|---|
| 81,260 A | 8/1868 | Davis | |
| 2,087,814 A | * 7/1937 | Rawlings | 408/226 |
| 2,393,424 A | * 1/1946 | Selch | 408/226 |
| 2,606,366 A | * 8/1952 | Stevens | 408/226 |
| 2,736,562 A | 2/1956 | Blackburn | 279/76 |
| 2,965,382 A | 12/1960 | Schlage | 279/77 |
| 2,968,200 A | * 1/1961 | Latour | 408/226 |
| 3,051,025 A | * 8/1962 | Mieville | 408/226 |
| 3,053,118 A | * 9/1962 | Lavallee | 408/226 |
| 3,367,727 A | 2/1968 | Ward et al. | 306/28 |
| 3,658,351 A | 4/1972 | Benjamin et al. | 279/1 B |
| 3,758,222 A | 9/1973 | Oakes | 408/224 |
| 3,932,904 A | 1/1976 | Nilsson et al. | 7/14.1 R |
| 3,945,653 A | 3/1976 | Falchle | 279/97 |
| 3,965,510 A | 6/1976 | Ernst | 7/14.1 |
| 4,135,847 A | * 1/1979 | Hemmings | 407/32 |
| 4,184,692 A | 1/1980 | Benson et al. | 279/75 |
| 4,209,182 A | 6/1980 | Sheldon | 279/75 |
| 4,210,215 A | 7/1980 | Peetz et al. | 175/394 |
| D257,511 S | 11/1980 | Zahn | D15/139 |
| 4,290,617 A | 9/1981 | Yoshida | 279/75 |
| 4,413,937 A | 11/1983 | Gutsche | 408/239 |
| 4,437,365 A | * 3/1984 | Yaari | 279/143 |
| RE31,755 E | 12/1984 | Wanner et al. | 464/167 |
| 4,514,117 A | 4/1985 | Scott | 408/239 |
| 4,582,458 A | 4/1986 | Korb et al. | 408/224 |
| 4,588,335 A | 5/1986 | Pearson, Jr. | 408/239 |
| 4,594,036 A | 6/1986 | Hogenhout | 408/240 |
| 4,629,375 A | 12/1986 | Lieser | 408/239 |

(List continued on next page.)

OTHER PUBLICATIONS

Brochure entitled "Insty–Bit Patented Quick Change System," 1993/1994, by Wienhold Associates, Minneapolis, MN 55426.

(List continued on next page.)

*Primary Examiner*—Daniel W. Howell
(74) *Attorney, Agent, or Firm*—Kinney & Lange, P.A.

(57) ABSTRACT

The invention is a tool bit for use in a socket or chuck mechanism. The tool bit includes an elongated shank having an operative tip end and an opposite tail end. A polymer jacket is molded about the tail end of the shank, and the jacket in the lateral cross-section, has a hex-shaped outer surface.

7 Claims, 2 Drawing Sheets

U.S. PATENT DOCUMENTS

| | | | |
|---|---|---|---|
| 4,692,073 A | 9/1987 | Martindell | 408/239 |
| 4,710,079 A | 12/1987 | Smith et al. | 409/234 |
| 4,789,276 A | 12/1988 | Clarke | 408/230 |
| 4,858,939 A | 8/1989 | Riggs | 279/75 |
| 4,900,202 A | 2/1990 | Wienhold | 408/240 |
| 4,990,038 A | 2/1991 | DeLong | 408/127 |
| 5,013,194 A | 5/1991 | Wienhold | 408/240 |
| D347,848 S | 6/1994 | Maynard, Jr. | D15/139 |
| 5,387,059 A | 2/1995 | Borzemsky | 408/226 |
| 5,417,527 A | 5/1995 | Wienhold | 408/239 |
| 5,466,100 A | 11/1995 | Ahluwalia | 408/224 |
| D390,239 S | 2/1998 | Malin | D15/139 |
| 5,782,636 A | 7/1998 | Armstrong et al. | 433/165 |
| 5,797,711 A | 8/1998 | Mulgrave et al. | 408/226 |
| D408,424 S | 4/1999 | Schmotzer | D15/139 |
| D419,575 S | 1/2000 | Kouvelis | D15/139 |
| 6,135,462 A | 10/2000 | Robison | 279/137 |
| 6,199,872 B1 | 3/2001 | Hasan | 279/30 |
| 2002/0009342 A1 * | 1/2002 | Vasudeva | 408/226 |

OTHER PUBLICATIONS

Brochure entitled "Insty–Bit® Quick–Change Drilling System," 1991–1993, by Wienhold Associates, Minneapolis, MN 55426.

Brochure entitled "Insty–Bit® Patented Quick–Change System," 1994, by Insty–Bit, Inc., Minneapolis, MN 55405.

Article entitled "Faster, Better Drilling for Finish Carpenters," *Fine Homebuilding*, by Bruce Greenlaw, Feb./Mar. 1996.

Declaration of James L. Wienhold regarding Sears® Speed–Lok type drill bits.

* cited by examiner

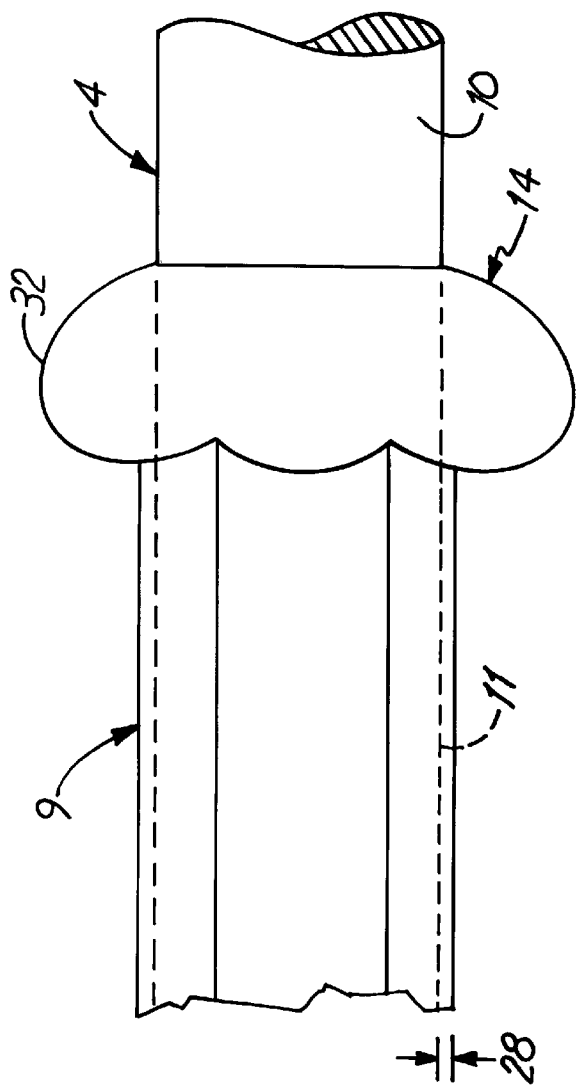
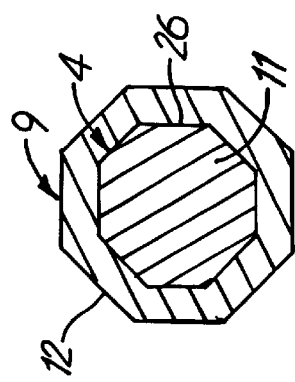
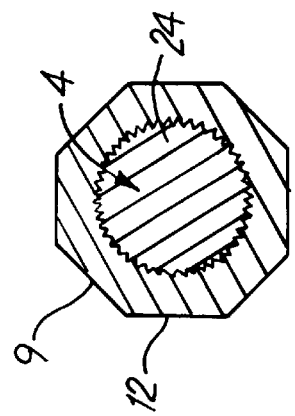

DRILL BIT TAIL

CROSS-REFERENCE TO RELATED APPLICATION

This application claims priority from U.S. Provisional Application No. 60/204,973 filed May 17, 2000 for "DRILL BIT TAIL" by James L. Wienhold which is incorporated by reference in its entirety herein.

BACKGROUND OF THE INVENTION

This invention relates to a tool bit which will fit in a quick release chuck. A quick release chuck is used to quickly change tool bits in the chuck of a tool. A example of one such quick release chuck apparatus is described in U.S. Pat. No. 4,900,202 (incorporated by reference in its entirety herein), which discloses a spring biased sleeve disposed on a spindle for aligning one or more detent balls relative to a tool bit.

Tool bits are used for drilling and for driving fastener devices such as screws, nuts and bolts, and other work elements requiring rotational motion. The American National Standards Institute has a specification, known as ANSI B 107.4-1982, which pertains to the driving and spindle ends for portable powered and hand held machines using the tool bits. The standard reflects the long term and pervasive use of such tool bits and the large inventory of tools available.

Tool bits manufactured in accordance with the ANSI standard have a hexagonally shaped tail (in lateral cross-section) with a circumferential arcuate groove formed into the tail. A detent ball in a quick release chuck applies normal and tangential forces against the groove in the shank of the tool bit to hold the tool bit in place. This groove must be precisely machined in order for the ball to fit and lock the bit into the tool.

The tool bit is made up of two main parts. The first part of the tool bit is an elongated shank, which includes a working end and a tail end. The working end is the drilling head or driving head, according to the use of the tool. The second part of the tool bit is the hexagonally configured end which is mounted into the chuck of the tool. This later portion of the tool bit is known as the bit tail. Bit tails are made of precision machined metal hex stock. The circumferential groove is machined into the metal hex stock, and the metal hex stock is bored to receive the elongated shank of the tool bit, usually by friction fit. Each bit tail, therefore, must be machined to fit the end of the elongated shank onto the bit, in such a manner as to provide a tight friction fit between the bit tail and the elongated shank. It is known to mold zinc about a tail bit, with a hex-shaped outer surface. Using zinc molded over the shank, however, subjects the elongated shank to high temperatures, since the zinc must be molten as it is formed about the shank. The shank often deforms when subjected to the high temperatures, causing shrinkage and dimensional variations to the shank itself. Additionally, special equipment is typically needed to mold the zinc about the shank which can become cost prohibitive. The resulting shanks are heavy, adding to the cost of shipping the zinc molded shanks.

BRIEF SUMMARY OF THE INVENTION

The invention is a tool bit that is used in a quick release socket or chuck mechanism. The tool bit has an elongated shank with on operative tip end and an opposite tail end. A polymer jacket is molded to extend along a portion of the tail end of the shank, and the jacket has a hex-shaped outer surface in lateral cross-section.

The invention is also characterized as a method for fastening a polymer jacket onto a metal tool bit. The method includes forming a portion of a tail end of the tool bit to be non-circular in lateral cross-section. The method further includes molding a polymer composition about the tail end of the tool bit, including at least the non-circular portion thereof, to define a polymer jacket which has, in lateral cross-section, a hex-shaped outer surface.

BRIEF DESCRIPTION OF THE DRAWINGS

The present invention will be further explained with reference to the drawing figures referenced below, wherein like structure is referred to by like numerals throughout the several views.

FIG. 4A is a sectional view of a second embodiment of the tool bit of the present invention, as if taken along line 3–3 of FIG. 1.

FIG. 4B is a sectional view of a third embodiment of the present invention, as if taken along line 3–3 of FIG. 1.

FIG. 5 is a fragmentary view of a portion of another embodiment of the tool bit of the present invention, showing an enlarged ring on the molded tool bit jacket.

While the above-identified drawings set forth several preferred embodiments, other embodiments of the present invention are also contemplated, as noted in the discussion. This disclosure presents illustrative embodiments of the present invention by the way of representation and not limitation. Numerous other modifications and embodiments can be devised by those skilled in the art which fall within the scope and spirit of the principles of this invention.

DETAILED DESCRIPTION

Figure 1:
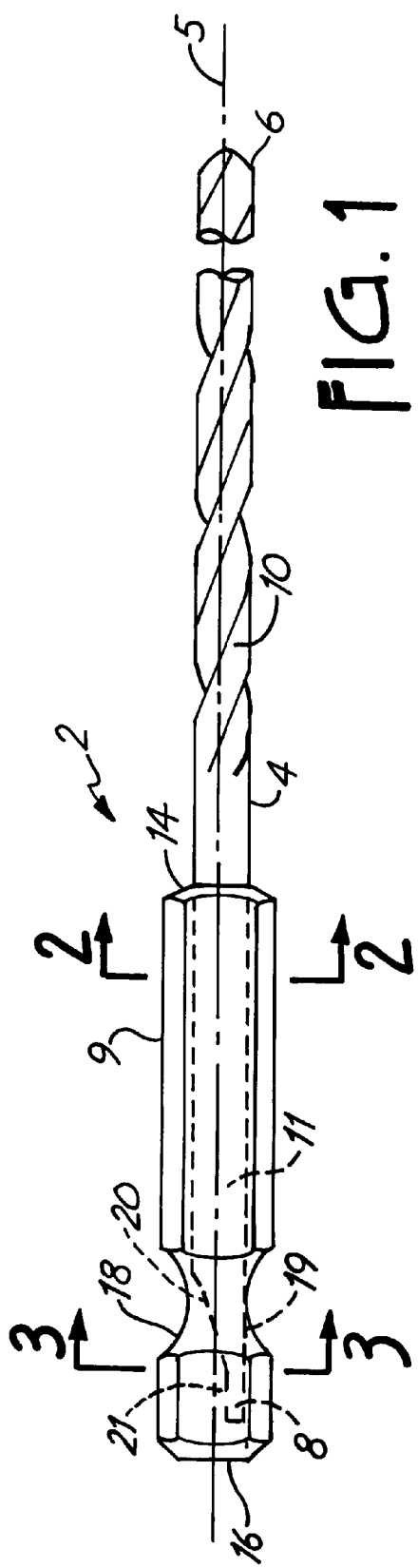
FIG. 1 is an elevational view of a tool bit of the present invention.

FIG. 1 illustrates a tool bit 2 of the present invention. The tool bit 2 includes an elongated shank 4 which can be in the form of a drill bit (as shown), a driving bit, or some other device. The shank 4 has a longitudinal axis of rotation extending between an operative distal tip end 6 and an opposite proximal tail end 8.

Figure 2:
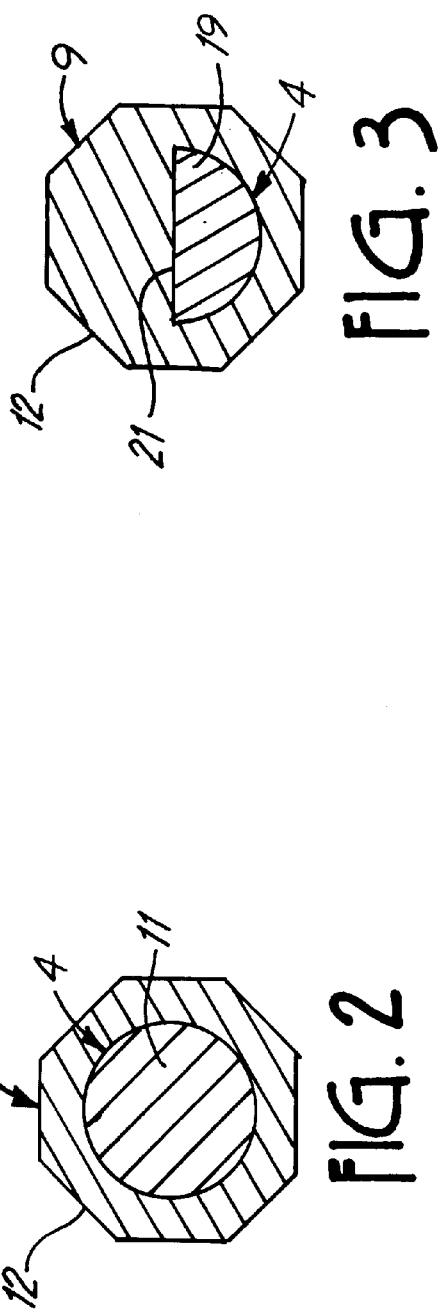
FIG. 2 is a sectional view as taken along line 2–2 of FIG. 1.

A jacket 9 is coaxially molded around the tail end 8 of the shank 4, so that the shank 4 has a distal exposed portion 10 and a proximal encased portion 11. Externally, the jacket 9 has a hexagonal lateral cross sectional surface 12, as shown in FIG. 2.

The jacket 9, extends over the encased portion 11 of the shank 4 from a distal end 14 to a proximal end 16, as shown in FIG. 1. An arcuate groove 18 extends circumferentially about the hexagonal surface 12 of the jacket 9. The lateral cross sectional surface 12 is hexagonally shaped to mate with the counterbore of the spindle in a tool chuck (not shown). The groove 18 is shaped to accommodate one or more detent balls in a standard quick release locking mechanism in the tool chuck, in order to hold the tool bit 2 in the tool chuck.

Figure 3:
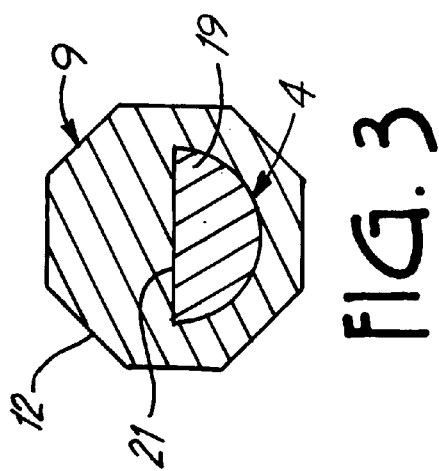
FIG. 3 is a sectional view as taken along line 3–3 of FIG. 1.

The distal exposed portion 10 of the shank 4 of a tool bit typically has a symmetrical shape (ie., circular), in lateral cross-section. The proximal encased portion 11 of the shank 4 has surface or shape irregularities to ensure coupled rotational and longitudinal movement of the shank 4 and jacket 9 molded thereon. In FIGS. 1 and 3, for example, a proximal segment 19 of the encased portion 11 of the shank 4 is reduced in cross-section from taper 20 down to flat chord surface 21 (assuming a half-moon shape in shank cross-section). As molded, the material of the jacket 9 fills any voids caused by the removal or lack of material from the shaft 4. This ensures that driven rotation of the jacket 9 (by the tool chuck) will likewise rotate the shank 4.

The jacket 9 is molded onto the shank 4, and is preferably formed from a polymer composition, such as glass filled nylon. One example of this material is Nylind 54HSL BK001 glass reinforced nylon resin manufactured by DUPONT®. Nylind is a 43% glass reinforced heat stabilized black nylon resin.

The polymer jacket 9 can be injected molded over the elongate shank 4. Injection molding is a more cost effective means for manufacturing the jacket 9 than was available previously. The final product is also lighter than that previously known, decreasing the costs for shipping. Forming time is typically less than that used for prior art jackets. Additionally, there is no deformation of the elongate shank 4, since the melting temperature of the preferred polymer material is much less than that of the elongate shank 4.

FIGS. 4A and 4B show possible alternative (but not exclusive) cross sectional profiles for portions of the proximal encased portion 11 of the shank 4.

FIG. 4A illustrates a proximal encased portion 11 of the shank having an irregular surface, such as knurling 24. The knurling 24 in this embodiment extends completely around the circumference of the shank 4, however, in other embodiments it may extend only part way around or used in combination with other irregular shank shapes. In FIG. 4B the shank 4 has been milled such that a lateral cross section of the proximal encased portion 11 of the shank 4 has a hexagonal shape 26. These are just a few examples of the multitude of shapes and/or textures that may be formed on the shank 4 to create multiple surfaces on which the jacket 9 can be molded. Using large surface areas to interface between the molded jacket 9 and the elongate shank 4 as illustrated in FIGS. 3, 4A and 4B provides high torque transferal between the jacket 9 and the shank 4. Thus, slippage between the jacket 9 and the shank 4 is eliminated.

In some embodiments, the dimensions of the lateral cross section of the proximal encased portion 11 of the shank 4 may approach the dimensions of the lateral cross sectional surface 12 of the jacket 9. The encased portion 11 of the shank 4 may be larger due to work requirements of the bit 2, while the jacket 9 needs to maintain standard outer hex-shaped dimensions in order to fit into the tool chuck (not shown). As a result, the material of the jacket 9 forms an increasingly thin layer 28 over the shank 4. When the layer 28 becomes too thin, the polymer jacket 9 can crack or break as torque is applied to the tool bit 2. To prevent this problem, an enlarged diameter polymer ring 32 is molded completely about the distal end 14 of the jacket 9, as shown in FIG. 5. The ring 32 provides additional jacket material, and gives added strength and support to the jacket 9 to prevent breaking and cracking of the jacket 9 when torque is applied to the tool bit 2.

The drill bit tail of the present invention provides an inexpensive and efficient means for making a tool bit jacket. No expensive machining operations are required. Instead, precision molding techniques place a suitable polymer composition onto a tool shank to form a hex-shaped jacket thereon. The jacket is strong and durable so as to withstand the rigors of field use of such tools, and will efficiently transfer torque from the jacket to the bit without slippage.

Although the present invention has been described with reference to preferred embodiments, workers skilled in the art will recognize that changes may be made in form and detail without drafting from the spirit and scope of the invention.

What is claimed is:

1. A tool bit for use in a socket or chuck mechanism, the tool bit comprising:

an elongated shank, the elongated shank having an operative tip end and an opposite tail end wherein a portion of an outer surface of the tail end of the shank is knurled; and a polymer jacket molded to extend along a portion of the tail end of the shank, wherein, in lateral cross section, the jacket has a hex-shaped outer surface.

2. The tool bit of claim 1, wherein said jacket has a proximal end and an opposite distal end, and wherein the jacket has a groove extending circumferentially thereabout, adjacent its proximal end.

3. The tool bit of claim 1 wherein the polymer jacket is glass reinforced nylon resin.

4. The tool bit of claim 1 wherein a portion of the tail end of the shank is tapered.

5. The tool bit of claim 2 wherein the jacket has, adjacent its distal end, an enlarged circumferential radius.

6. A method for fastening a polymer jacket onto a metal tool bit shank comprises the steps of:

forming a portion of a tail end of the tool bit shank to be non-circular in lateral cross-section forming a knurled outer surface on the tail end of the tool bit shank;

forming a knurled outer surface on the tail end of the tool bit shank; and molding a polymer composition about the tail end of the tool bit, including at least the non-circular portion thereof, to define a polymer jacket, wherein a lateral cross section of the jacket which has a hex-shaped outer surface.

7. The method of claim 6 and further comprising:

forming the polymer jacket from glass filled nylon.

* * * * *

UNITED STATES PATENT AND TRADEMARK OFFICE
CERTIFICATE OF CORRECTION

PATENT NO. : 6,588,994 B2
DATED : July 8, 2003
INVENTOR(S) : James L. Wienhold

It is certified that error appears in the above-identified patent and that said Letters Patent is hereby corrected as shown below:

<u>Column 2,</u>
Line 45, delete "rotation", insert -- rotation 5 --

Signed and Sealed this

Twenty-eighth Day of October, 2003

JAMES E. ROGAN
*Director of the United States Patent and Trademark Office*